United States Patent Office 3,487,870
Patented Jan. 6, 1970

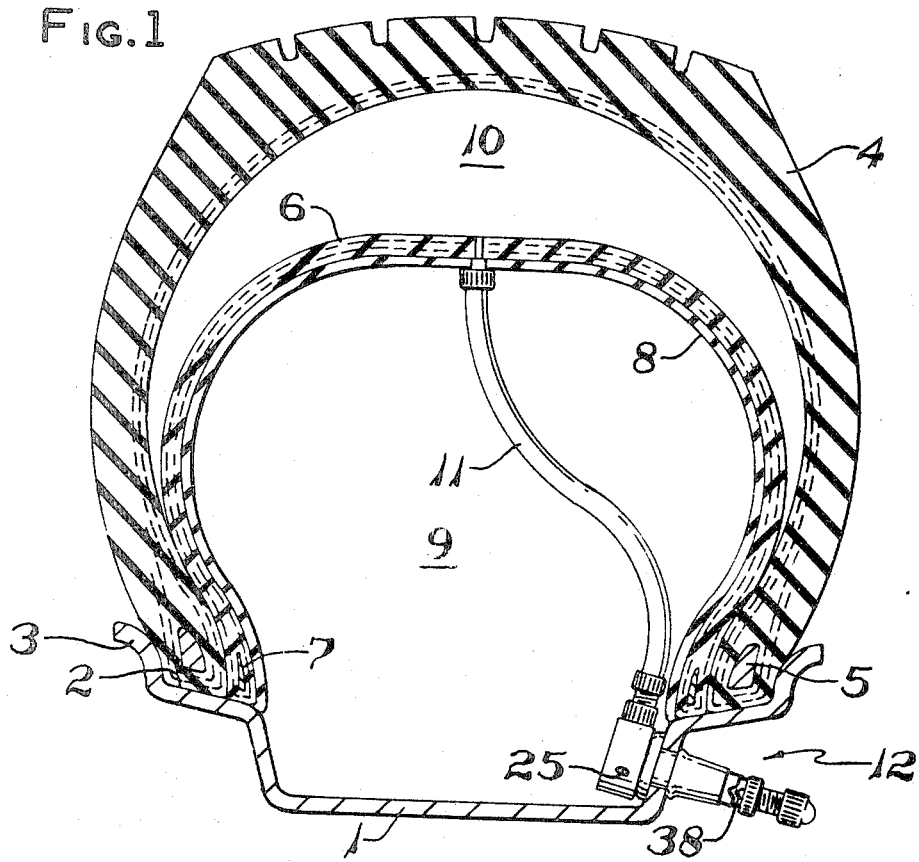
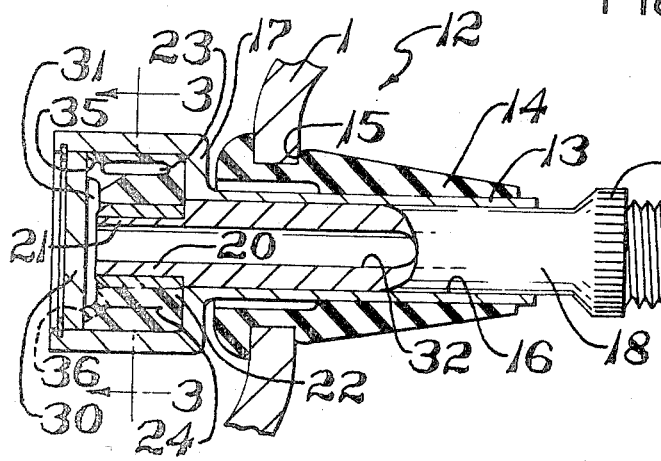
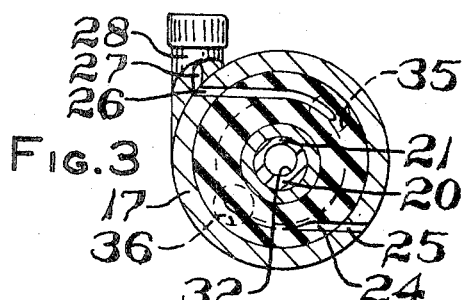

3,487,870
TIRE
Victor R. Huber, Akron, Ohio, assignor to The B. F. Goodrich Company, New York, N.Y., a corporation of New York
Original application May 23, 1967, Ser. No. 640,688. Divided and this application Apr. 8, 1969, Ser. No. 814,325
Int. Cl. B60c 5/02, 29/00
U.S. Cl. 152—340
3 Claims

ABSTRACT OF THE DISCLOSURE

A safety tire having an inner tire mounted in an outer tire with a valve operative to provide selective gauging, deflation or pressurization of the respective dual chambers defined by the outer tire, inner tire and the rim.

CROSS REFERENCE TO RELATED APPLICATIONS

This application is a division of copending application Ser. No. 640,688 filed May 23, 1967.

BACKGROUND OF THE INVENTION

This invention relates to a tire and more particularly to a safety tire having an inner tire mounted in an outer tire and cooperative with a valve that provides selective inflation or deflation of the separate chambers formed by the outer tire, inner tire, and the rim which receives such tires.

In dual chamber tires where the chambers are structurally separate, it is advantageous to provide a single valve means through which it is possible to inflate, deflate and gauge such chambers separately. Separate valves have been used for the separate inner and outer tires; however, such means is expensive and impractical as it requires special rims and accessories. Others have proposed to use a valve structure that has two separate air valves operating through two separate air passages; however, in view of the standardization in the industry, a redesign of the rim to accommodate such change would be impractical.

To provide a solution to the above problems, the present invention provides a dual chamber tire having a valve that is economical to manufacture, simple and useable on the ordinary conventional rim whether such be standard passenger, airplane or truck rim, facilitating the gauging inflating and deflating of either chamber quickly and without difficulty. No special tools are necessary to operate such valve structure, and there is no leakage between chambers through such valve structure. Such valve is adaptable for use with a multi-chamber tire assembly while mounting a positive seal for all such chambers.

BRIEF SUMMARY OF THE INVENTION

The present invention is directed to a safety tire having an inner chamber and an outer chamber in cooperation with a valve body having an annular deformable valve with a pair of spaced passageways. One of the passageways communicates with the inner chamber while the other passageway communicates with the outer chamber. A control member journaled in the valve body is operable to selectively provide communication from a suitable pressure source with one or the other of such passageways or for selective deflation of such inner or outer chamber.

BRIEF DESCRIPTION OF THE DRAWINGS

FIG. 1 is a cross-section view of a safety tire embodying the invention.

FIG. 2 is a cross-sectional view of a modified form of a safety tire embodying the invention.

FIG. 3 is a cross-sectional view of the modified form of tire valve taken along line 3—3 of FIG. 2.

Referring to the drawings and more particularly to FIG. 1 there is shown a tire rim 1 having spaced bead seats 2 with retaining flanges 3 adjacent thereto. A tubeless outer tire 4 having bead 5 is mounted on the rim 1. An inner tire 6 having beads 7 and rubberized reinforced material such as fabric extending therethrough has the edges thereof seated adjacent to the respective edges of the outer tire 4 on the bead seats 2. A butyl liner 8 is formed with the inner tire 6 which in cooperation with the rim 1 defines an inner chamber 9. A chamber 10 is defined by the inner tire 6 and the outer tire 4, which chamber 10 is adapted to be connected via a hose 11 and valve 12 to a suitable pressure source.

A tire valve 12 is shown in FIGS. 2 and 3 wherein such tire valve 12 has an outer longitudinally extending tubular valve body 13 which has its intermediate portion encased within a rubberized seal 14. Seal 14 is conical shaped with an annular recessed portion 15 which receives and sealingly engages the standard rim 1. Valve body 13 has a central bore 16 extending longitudinally therethrough. The one end portion of valve body 13 terminates into an enlarged hub portion 17. Rotatably mounted within the central bore 16 of valve body 13 is a control valve member 18 which has a knurled portion 19 at one end thereof and a reduced eccentric end portion at the other end thereof. As shown in FIGS. 2 and 3, such eccentric end portion has its thickened or enlarged portion 20 at the lowermost end portion and the thin walled portion 21 at the upper end portion thereof. Suitably secured to the inner wall of hub portion 17 is an annular deformable rubber valve member 22, which member 22 has a pair of horizontally extending passageways 23 and 24 extending therethrough. The horizontally extending passageways 24 communicate directly with a passageway 25 in the enlarged hub portion 17 which in turn communicates directly with the inner chamber 9; whereas, passageway 23 communicates with a passageway 26 in the hub portion 17 which in turn communicates through a bore 27 in a boss 28, suitably attached to the hub portion 17, for communication directly with the outer chamber 10 via hose 11. A plug 30 is mounted on the one end portion of the hub 17 which in cooperation with the annular deformable rubber valve member 22 defines a chamber 31 which is in communication with the longitudinally extending central passageway 32 of control valve member 18. Chamber 31 is also in communication via passageways 35 and 36 with passageways 23 and 24 respectively. Passageway 36 is shown in dotted lines in FIGS. 2 and 3 while passageway 35 is shown in dotted lines in FIG. 3 and full lines in FIG. 2. The outwardly extending valve portion of control valve member 18 is internally threaded to receive a standard valve core which as shown in FIG. 2 has an outwardly extending stem 37. Through the use of a conventional inflating hose and nozzle such stem 37 is adapted to be depressed to permit pressurization of the central passageway 32 and the chamber 31. Suitable indicia may be provided on the valve body 13 with a marker on the control valve member 18 to indicate the location of the eccentric portion 20, or valve body 13 may be provided with a plurality of recesses that are cooperative with a projection 38 on the control valve member 18 which indicates which passageway 23 or 24 is open.

In the operation of the tire valve 12, control valve member 18 is adapted to be rotated such that the enlarged portion 20 is adapted to exert a force on the annular deformable rubber valve member 22 to selectively close either passageway 23 or 24. With the enlarged portion as shown in FIGS. 2 and 3, passageway 24 is closed off and pressurized fluid via central passageway 32 is adapted to communicate with chamber 31, the passageways 35, 23 to chamber 10. Rotation of the control valve member 18 such that the enlarged portion 20 is rotated 180° opposite to that shown in FIG. 3, will operate to close passageway 23 and open passageway 24, such that the pressurized air through central passageway 32 is adapted to pressurize via chamber 31 and passageways 36 and 24, chamber 9.

What I claim is:

1. A tire valve for use in inflating an inner compartment and an outer compartment comprising a valve body, said valve body having an intermediate portion adapted to be mounted in an opening of a tire rim, said valve body having a bore extending longitudinally therethrough, one end portion of said valve body having a bore extending longitudinally therethrough, one end portion of said valve body being enlarged to define a cavity therein, a plug secured to said one end portion and cooperative with said hub to define a cavity, an annular deformable valve member in said cavity, said valve member having a pair of spaced passageways for communicating said bore through said cavity with said compartments respectively, a control valve member rotatably journaled in said valve body, said control valve member having a cam means on said one end portion for rolling engagement with the inner periphery of said annular deformable valve member wherein contact between said cam and said annular deformable valve member is operative to close off one of said passageways, and the other end portion of said control valve member having a core therein for controlling the pressurization of said bore and said cavity.

2. A safety tire having an outer tire member and an inner tire member mounted therein; said inner and outer tire members being mounted onto a vehicle rim to define a pair of closed chambers; a valve body attached to said inner tire and extending through an opening in said rim; said valve body having a pair of spaced ports on one end portion thereof communicating respectively with said chambers, said one end portion being enlarged to define a cavity therein, said valve body having an opening in the other end portion, a control member rotatably mounted in said valve body; said control member having a central passageway extending longitudinally therethrough, one end portion of said control member having a valve core mounted therein to control the passage of air therethrough; the other end portion of said control member having an eccentric portion, an annular compressible member mounted in said cavity having its inner bore slidably contacting said eccentric portion of said valve stem, said compressible member cooperative with said cavity and said enlarged one end portion of said valve body to define a clearance space in said cavity that communicates with said central passageway, said annular compressible member having a pair of spaced passageways communicating said clearance space with said spaced ports, and said eccentric portion being operative to selectively open one or the other of said spaced passageways.

3. A safety tire as set forth in claim 2 wherein said valve body and said control member have cooperative indicia thereon to indicate the location of said eccentric portion relative to said spaced passageways.

References Cited

UNITED STATES PATENTS

| | | | |
|---|---|---|---|
| 1,178,809 | 4/1916 | Kraft et al. | 152—340 |
| 2,091,006 | 8/1937 | Mayne | 152—340 |
| 2,295,392 | 9/1942 | Eberhard et al. | 152—342 |

ARTHUR L. LAPOINT, Primary Examiner

C. B. LYON, Assistant Examiner

U.S. Cl. X.R.

137—223; 152—427

PO-1050
(5/69)

UNITED STATES PATENT OFFICE
CERTIFICATE OF CORRECTION

Patent No. 3,487,870      Dated January 6, 1970

Inventor(s) Victor R. Huber

It is certified that error appears in the above-identified patent and that said Letters Patent are hereby corrected as shown below:

Column 3, line 30, the word "valve" has been omitted after "core".

SIGNED AND
SEALED
JUL 14 1970

(SEAL)
Attest:

Edward M. Fletcher, Jr.
Attesting Officer

WILLIAM E. SCHUYLER, JR.
Commissioner of Patents